United States Patent
Zhang et al.

(10) Patent No.: US 9,526,237 B2
(45) Date of Patent: Dec. 27, 2016

(54) TRAP FOR CRAWLING PESTS

(71) Applicants: Qing-He Zhang, Spokane Valley, WA (US); Rodney G. Schneidmiller, Greenacres, WA (US); Marc Chapin, Spokane, WA (US)

(72) Inventors: Qing-He Zhang, Spokane Valley, WA (US); Rodney G. Schneidmiller, Greenacres, WA (US); Marc Chapin, Spokane, WA (US)

(73) Assignee: Sterling International Inc., Spokane, WA (US)

( * ) Notice: Subject to any disclaimer, the term of this patent is extended or adjusted under 35 U.S.C. 154(b) by 755 days.

(21) Appl. No.: 13/904,906

(22) Filed: May 29, 2013

(65) Prior Publication Data

US 2013/0318860 A1 Dec. 5, 2013

Related U.S. Application Data (60) Provisional application No. 61/655,933, filed on Jun. 5, 2012.

(51) Int. Cl.
 *A01M 3/04* (2006.01)
 *A01M 1/14* (2006.01)
 *A01M 1/10* (2006.01)

(52) U.S. Cl.
 CPC .............. *A01M 1/14* (2013.01); *A01M 1/103* (2013.01)

(58) Field of Classification Search
 USPC ................ 43/136, 114, 133, 132.1, 135, 107
 See application file for complete search history.

(56) References Cited

U.S. PATENT DOCUMENTS

| | | | | |
|---|---|---|---|---|
| 731,843 | A * | 6/1903 | Bierley | A01M 1/14 43/114 |
| 3,864,866 | A * | 2/1975 | Kosinsky | A01M 23/005 206/447 |
| 3,913,259 | A | 10/1975 | Nishimura | |
| 4,709,503 | A | 12/1987 | McQueen | |
| 4,815,231 | A | 3/1989 | McQueen | |
| 5,425,197 | A * | 6/1995 | Smith | A01M 1/04 43/113 |
| 5,588,250 | A | 12/1996 | Chiba | |
| 7,469,501 | B1 * | 12/2008 | Blum | A01M 3/04 43/136 |
| 7,591,099 | B2 * | 9/2009 | Lang | A01M 1/023 43/107 |
| 7,954,275 | B2 * | 6/2011 | Frisch | A01M 23/30 43/114 |

(Continued)

*Primary Examiner* — Christopher P Ellis
(74) *Attorney, Agent, or Firm* — Christensen O'Connor Johnson Kindness PLLC (57) ABSTRACT

A reusable trap (100) and a fully disposable trap (200) include two opposing panels or walls (102, 202), each with a patterned adhesive portion (132, 232) on an inner surface. The trap is configured to provide easy access to crawling pests from all sides, and the patterned adhesive portion provides non-adhesive paths deep into the trap, such that crawling pests may venture further into the trap before encountering adhesive, thereby increasing the trapping capacity. The opposed panels or walls are configured to be urged together by the user, for example by stepping on the trap, to encase trapped pests therebetween, avoiding potential harmful exposure to the user during disposal.

20 Claims, 11 Drawing Sheets (56) References Cited

U.S. PATENT DOCUMENTS

| | | | | |
|---|---|---|---|---|
| 7,980,023 B2 * | 7/2011 | Nelson | ............... | A01M 25/004 |
| | | | | 43/114 |
| 8,316,578 B2 * | 11/2012 | Faham | ............... | A01M 1/023 |
| | | | | 43/107 |
| 2010/0043275 A1 * | 2/2010 | Battick | ............... | A01M 1/14 |
| | | | | 43/114 |
| 2011/0016769 A1 * | 1/2011 | Cink | ............... | A01M 23/08 |
| | | | | 43/65 |
| 2012/0291337 A1 * | 11/2012 | Curcio | ............... | A01M 1/14 |
| | | | | 43/114 |
| 2013/0312313 A1 * | 11/2013 | Lefkowitz | ............... | A01M 1/02 |
| | | | | 43/114 |

* cited by examiner

TRAP FOR CRAWLING PESTS

CROSS-REFERENCE TO RELATED APPLICATION

This application claims the benefit of U.S. Patent Application No. 61/655,933, filed Jun. 5, 2012, expressly incorporated herein by reference in its entirety.

BACKGROUND

Crawling arthropods, for example, insects and arachnids, can be pests, particularly when they are found in inhabited buildings such as homes, workshops, storage sheds, and the like. The pestiferous nature may range from annoyance when non-biting, non-disease vector arthropods invade a residence or other living space, to health threats when, for example, venomous, stinging, and/or disease vector pests such as certain spiders, or the like, are encountered. Crawling pests may be particularly undesirable in settings that are especially sensitive to health considerations, such as facilities used in the food processing industry.

One common approach for controlling such pests is through the use of pesticides or other poisons. However, such poisons may present health hazards of their own, and may be undesirable for other reasons, including the risk of causing harm to beneficial insects or to other animals, risks or damage to the environment, and risks to children and pets.

A common, non-poisonous approach to controlling pests is through the use of adhesive or sticky substrates, such as flypaper strips, to capture and immobilize pests. Flypaper strips are commonly used to capture flying insects, for example, and similar adhesive panels have been used to capture other arthropods. For example, commercial spider traps are available that comprise a tubular substrate such as cardboard having an adhesive applied to an inner surface. Such pests that enter the tubular substrate become stuck to the adhesive. An exemplary prior art trap is shown, for example, in FIG. 9 of U.S. Pat. No. 5,588,250, to Chiba et al. Chiba et al. is hereby incorporated by reference in its entirety. As used herein, unless clearly intended otherwise the term "insects" will generally include, but is not limited to, arachnids and true insects. Also, as used herein the term "crawling insects" includes, crawling arthropods whether they crawl exclusively or are also able to fly or engage in other modes of locomotion.

However, such traps typically must be handled after the pests are trapped in the adhesive, which may cause some risk and anxiety regarding whether the trap contains any recently trapped pest that might still pose a threat to the user. Another disadvantage to such traps is that they are typically have limited access, for example having an entry on only one or two ends of the trap. The high directionality of such a trap limits its effectiveness, particularly for crawling pests, because entrapment requires that the pest approach or encounter the trap from a particular direction.

It would be beneficial to provide a trap for crawling arthropods that provides protection to the user when emptying the trap, and that provides near-360 degree access to the trap.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A trap for pests, for example for spiders, includes first and second opposed disposable wall portions disposed generally in spaced-apart orientation by biasing elements. Each of the wall portions includes inwardly-facing disposable adhesive panels, defining an entrapment region therebetween. The walls are configured to be urged toward each other against the force of the biasing elements to close the entrapment region such that the adhesive panels contact each other to encase the arthropods therebetween.

In an embodiment, the first and second wall portions define posts and tubular receivers that slidably engage, with springs disposed in the tubular receivers.

In an embodiment, the wall portions define at least four ramp portions that provide access to the entrapment region from all sides of the trap.

In an embodiment, the adhesive panels are separable from the wall portions, and the wall portions define flexible panels that extend through apertures in the wall portions to dislodge the separable adhesive panels from the wall portions.

In an embodiment, the first and second wall portions are identical.

In an embodiment, the adhesive panels define irregular adhesive patterns, for example star-shaped, zig-zag, or diamond-shaped patterns, that define a plurality of non-adhesive paths into the entrapment region.

In another aspect, a method for trapping crawling pests comprises providing a trap having opposed first and second walls that are elastically biased apart and define an entrapment region therebetween, wherein an adhesive portion is provided on each of the first and second walls. The first and second walls define an upper boundary and a lower boundary of the entrapment region. The adhesive portions define a pattern having a large perimeter defining non-adhesive pathways into the entrapment region. The trap is then positioned in a location wherein crawling pests are expected to encounter the entrapment region, and thus, become adhered to one of the adhesive portions. After one or more pests have become adhered to one of the adhesive portions, urging the first and second wall portions together causes the adhesive portions to become adhered together with the one or more pests encased therebetween.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
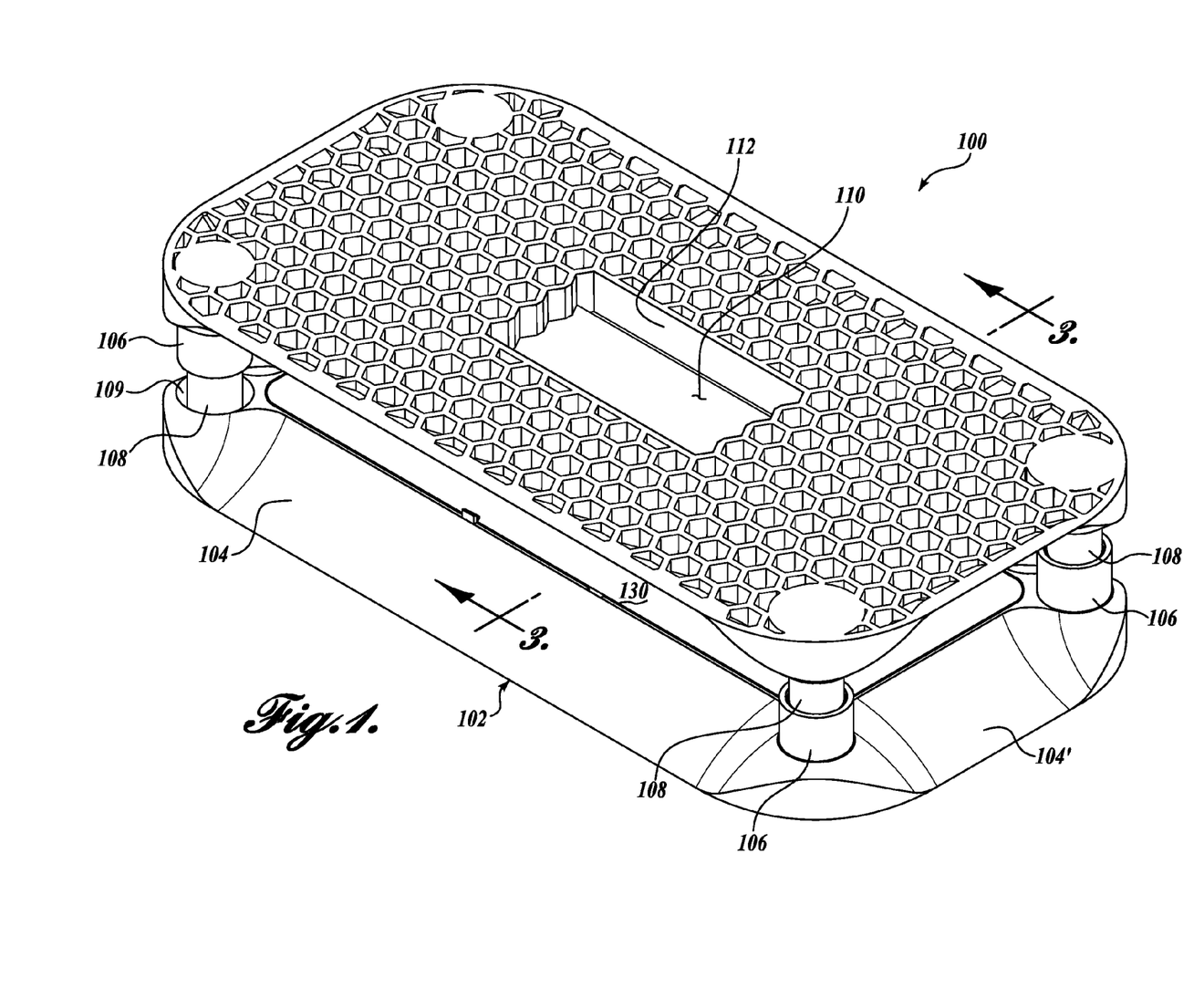
FIG. 1 is a perspective view of a trap in accordance with the present invention.

A perspective view of an exemplary trap 100 for crawling pests in accordance with the present invention is shown in FIG. 1. The trap 100 is suitable for trapping crawling pests such as arachnids, crawling insects such as ants and cockroaches, and the like. The trap 100 may also be used for trapping crawling pests that also have the ability to fly, such as wasps, stink bugs, or the like. The trap 100 has particular advantages for trapping pests that may have unpleasant defense mechanisms, such as stingers, biting mandibles, foul odor or the like, because the entrapped pests may be discarded without the user risking contact with the pest.

The trap 100 includes a pair of parallel wall portions 102 that are elastically urged apart to define an entrapment region between the wall portions 102. Entrapment panels, for example, adhesive panels 130, are releasably retained on the facing sides 101 of the wall portions 102. Refer also to an exploded view of the trap 100 shown in FIG. 2.

Figure 2:
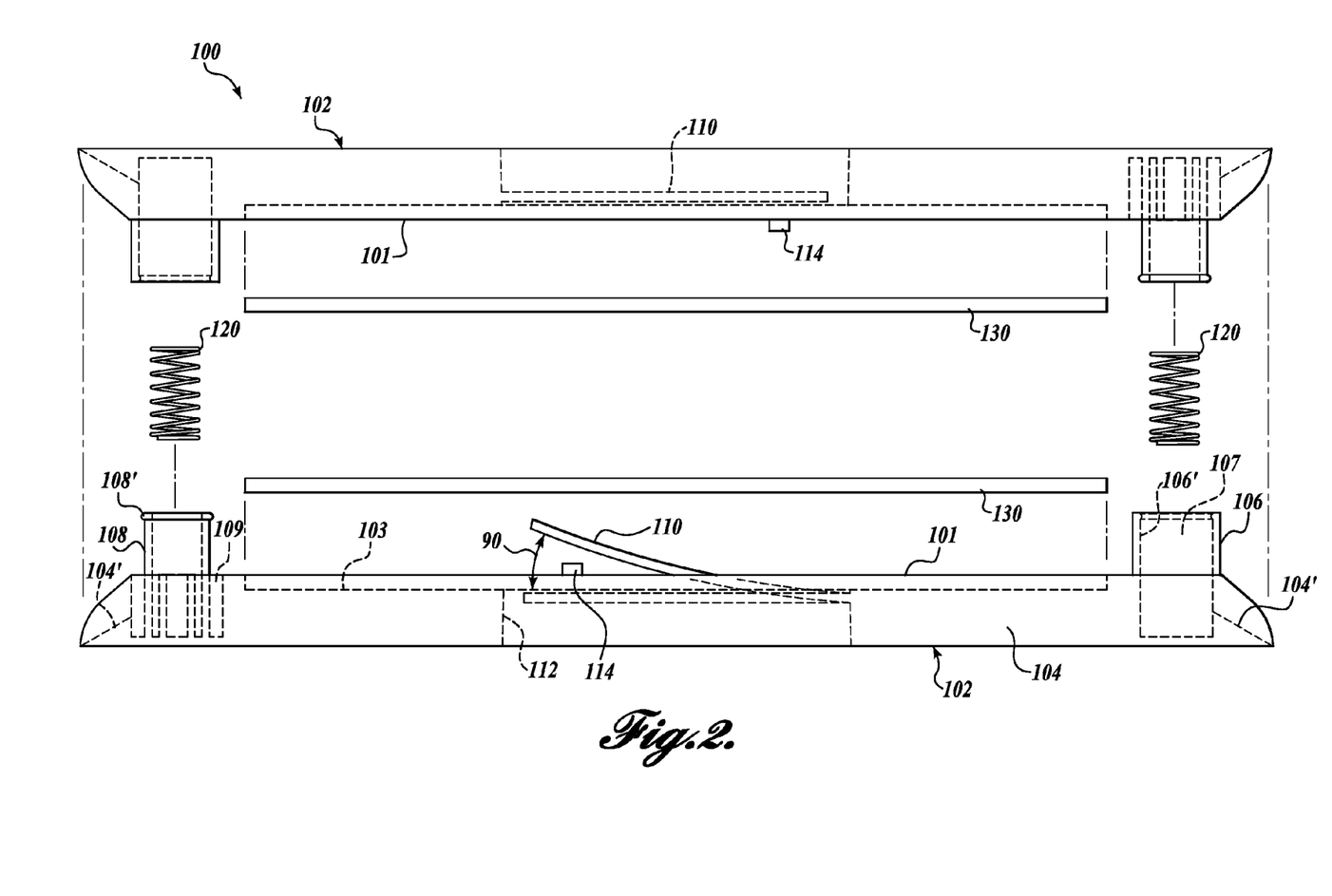
FIG. 2 is an exploded side view of the trap shown in FIG. 1.

The trap 100 includes first and second wall portions 102. The wall portions 102 each define a recessed bed 103 with gently sloped ramps 104, 104' providing ready access to the recessed bed 103 from all sides. In this embodiment, the wall portions 102 are generally rectangular with rounded corners. Tubular receivers 106 extend away from two corners of the facing sides 101 of each wall portion 102. Tubular posts 108 extend away from the facing sides 101 of the other two corners.

The tubular receivers 106 define an aperture 107 that is sized and positioned to slidably receive a corresponding tubular post 108 from the facing wall portion 102. In FIG. 1, for example, the tubular receivers 106 extend upwardly from the forward corners of the first or lower wall portion 102, and the tubular posts 108 extend upwardly from the rear corners of the lower wall portion 102. The tubular posts 108 for the second or upper wall portion 102 extend downwardly to engage the tubular receivers 108 of the lower wall portion 102, and the tubular receivers 106 receive the tubular posts 108 from the lower wall portion 102.

The tubular posts 108 are sized and configured to be inserted into corresponding tubular receivers 106. In this embodiment, the tubular receivers 106 include an inner rim 106' at the distal end, and the tubular posts 108 include an outer rim 108' at the distal end. The inwardly and outwardly disposed rims 106', 108' are sized such that the tubular posts 108 may be inserted into the tubular receivers 106 of another wall portion 102 with an interference fit, such that the wall portions 102 will releasably snap together.

As seen in FIG. 2, a coil spring or other biasing element 120 is disposed in the aperture 107 in the tubular receiver 106, and is configured to bias the upper and lower wall portions 102 apart.

An annular recess 109 is defined in the wall portions 102 concentric with the corresponding tubular posts 108. The annular recess 109 is sized to slidably receive the corresponding tubular receiver 106 on the other wall portion 102.

Figure 3:
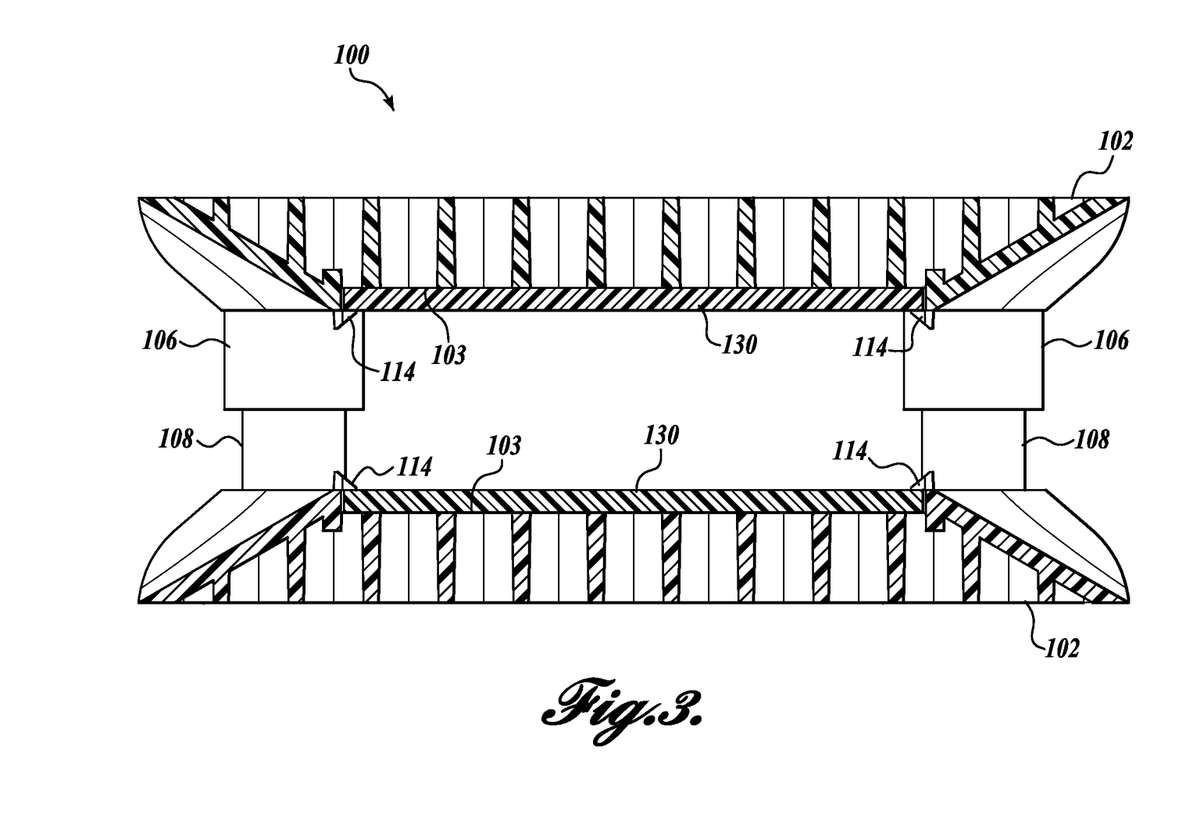
FIG. 3 is an end section view of the trap shown in FIG. 1 through section 3-3.

Refer now also to FIG. 3, which shows a section view of the trap 100 through section 3-3 indicated in FIG. 1. The recessed bed 103 defined in each of the wall portions 102 receives a disposable adhesive panel 130. The adhesive panels 130 are sized and configured to fit in the corresponding recessed bed 103, and are retained on the recessed bed 103 by edge retainers 114. At least a portion of the inwardly facing surface of the adhesive panels 130 is covered with an adhesive that is formulated to entrap crawling pests, such that pests crawling onto the adhesive portions become fixed to the adhesive panel 130 and are unable to escape.

Each wall portion 102 is substantially rigid. In a current embodiment, the rigidity is conveniently achieved in a lightweight and inexpensive construction by forming the wall portions 102 with a honeycomb structure, although other construction is clearly contemplated. For example, the wall portions 102 may be formed from a rigid polymeric foam or from a natural material such as wood. Referring again to FIGS. 1 and 2, each wall portion 102 includes a centrally located aperture 112 having a flexible plate 110 cantilevered along one edge of the aperture 112 such that the flexible plate 110 can be flexed inwardly, as indicated by arrow 90.

The operation of the trap 100 can now be appreciated. The wall portions 102 are typically assembled when the user obtains the trap 100. Upper and lower disposable adhesive panels 130 are placed into the recessed bed 103 of each wall portion 102, and are retained on the bed 103 by edge retainers 114. The trap 100 is then placed in a desired location. It should be appreciated that the trap 100 is accessible from all four sides, by the gently sloping ramps 104. Additionally, the trap 100 in this embodiment is reversible (invertible), and therefore the trap 100 may be flipped when one adhesive panel 130 becomes suitably filled with pests. The flat outer surfaces of wall portions 102 facilitate placement on any flat surface, for example, on a floor or counter. The entrapment region defined by the adhesive panels 130 is in the relatively narrow region between the wall portions 102. Therefore the traps 100 are unlikely to become inadvertently stuck to unintended parties, such as household pets, young children, or unwary travelers in an area containing the trap 100.

Figure 4:
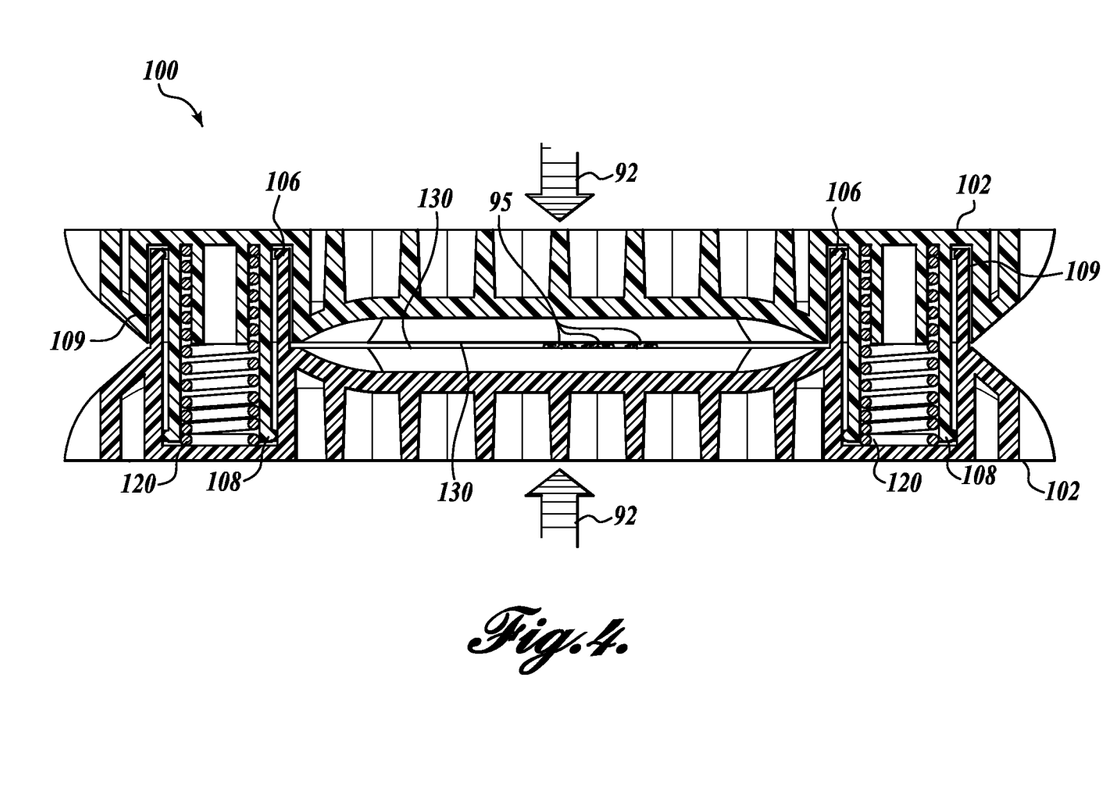
FIG. 4 is an end section view of the trap shown in FIG. 1 through the tubular posts, with the trap urged toward the closed position.

When the trap 100 is sufficiently full of pests, and typically after flipping the trap 100 to allow the second adhesive panel 130 to entrap pests 95, the user may simply step on or otherwise urge the wall portions 102 together, which is indicated by arrows 92 in the sectional end view shown in FIG. 4. As the wall portions 102 are urged together against the elastic force of the springs 120, the tubular receivers 106 are received into the corresponding annular recess 109, and the tubular posts 108 are received into the corresponding tubular receiver 106, to allow the inner surfaces of the adhesive panels 130 to contact each other and become adhered. The pests 95 that have become stuck to the adhesive panels 130 will thereby be crushed and/or enclosed between the panels 130.

When the closing force is removed, the wall portions 102 will separate due to the biasing force of the springs 120. The separation of the wall portions 102 is limited by the interference between the rims 106', 108'.

Figure 5:
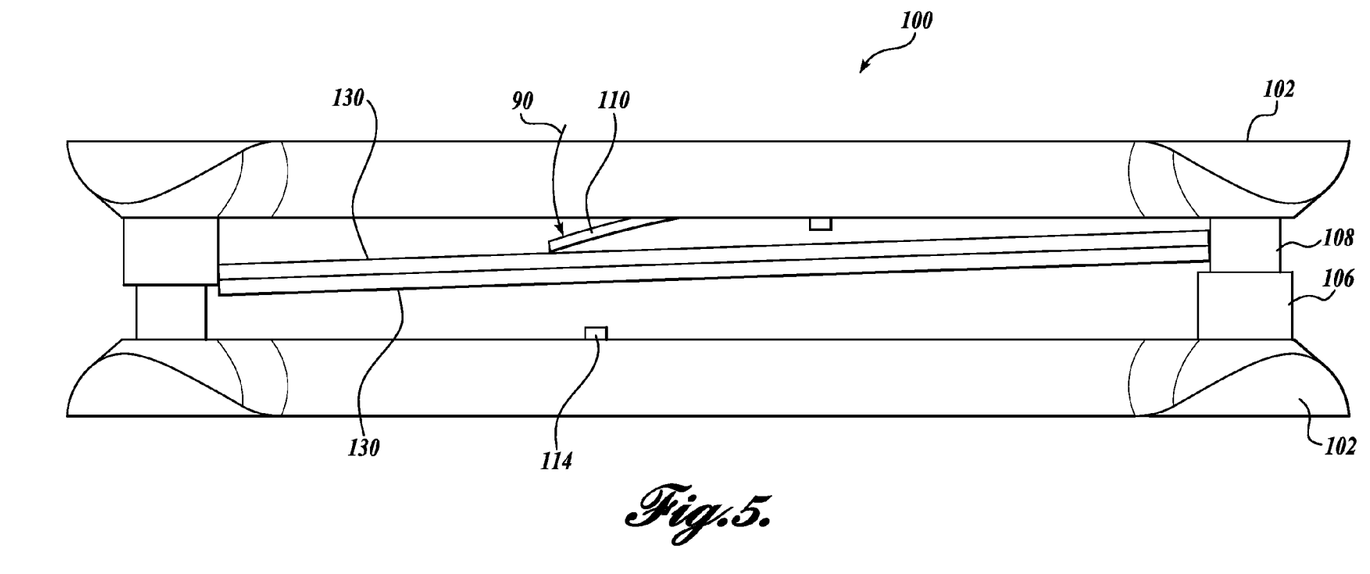
FIG. 5 is a side view of the trap shown in FIG. 1, showing one of the flexible plates releasing the adhesive panels after the trap has been closed to join the adhesive panels, and then released.

At least one of the adhesive panels 130 will release from the corresponding wall portion 102 due to the adhesive attachment to the opposing adhesive panel 130. As illustrated in the side view of FIG. 5, the user may then depress the appropriate flexible plate 110 from the recess 112 (FIG. 1) through the wall portion 102 to release the adhesive panels 130, which may then be dropped directly into a suitable repository. Therefore, the adhesive panels 130 in this embodiment may be removed and disposed of without the user directly touching the panels 130.

Of particular note, the trap 100 allows the user to effectively crush, or otherwise immobilize, encapsulate, or enclose the pests prior to handling the trap 100. For example, by stepping on the trap 100, any threat from the pests (for example, with a stinger, venom, or the like) can be substantially neutralized, and the user does not need to worry that one or more of the trapped pests may still be active. As a further safety advantage, the user does not need to handle the adhesive panels 130 directly after stepping on the trap 100. Rather, the user may simply hold the trap 100 by the wall portions 102 wall away from the adhesive panels 130 over a receptacle, and depress one or both of the flexible plates 110 to release the panels 130, which will drop into the receptacle.

To reset the trap 100, the user simply replaces the adhesive panels 130 in the recessed beds 130, such that they are retained by the edge retainers 114. The trap 100 may then be positioned in the same, or a different location.

In a current embodiment of the trap 100, the entrapment region defined between the adhesive panels 130 is between about 0.3 inch and 2.0 inch, and more preferably between 0.4 inch and 1.0 inch.

One advantage of the currently preferred embodiment of the trap, as described above, is that the two wall portions 102 are identical, and the simple design requires only three unique parts, the wall portions 102, the springs 120, and the disposable adhesive panels 130. Although this elegant design is not necessary for the present invention, it will be readily apparent this construction provides for low manufacturing costs. In particular, the wall portions 102 each have two tubular receivers 106 and two tubular posts 108 that are symmetrically disposed on the wall portions 102. The wall portions 102 may therefore be aligned such that the tubular receivers 106 for one wall portion align with the tubular posts 108 of the other wall portion 102. Although the disclosed trap 100 shown in FIG. 1 is symmetric about the long axis of the wall portion 102, it will be readily apparent that the trap may alternatively be constructed to be symmetric about the short axis, or even about the diagonal axis.

It is also contemplated that the wall portions 102 do not need to be rectangular. For example, the wall portions (and associated adhesive panels 130) may be formed with a circular, triangular, or polygonal plan form. Advantageously, the wall portions may include symmetrically disposed receivers and posts arranged such that the wall portions are identical. Alternatively, the wall portions may be not be identical. For example, it is contemplated that a trap in accordance with the present invention may be constructed with a generally triangular plan form, with tubular receivers formed on one wall portion, and tubular posts formed on the opposing wall portion.

Figure 6A:
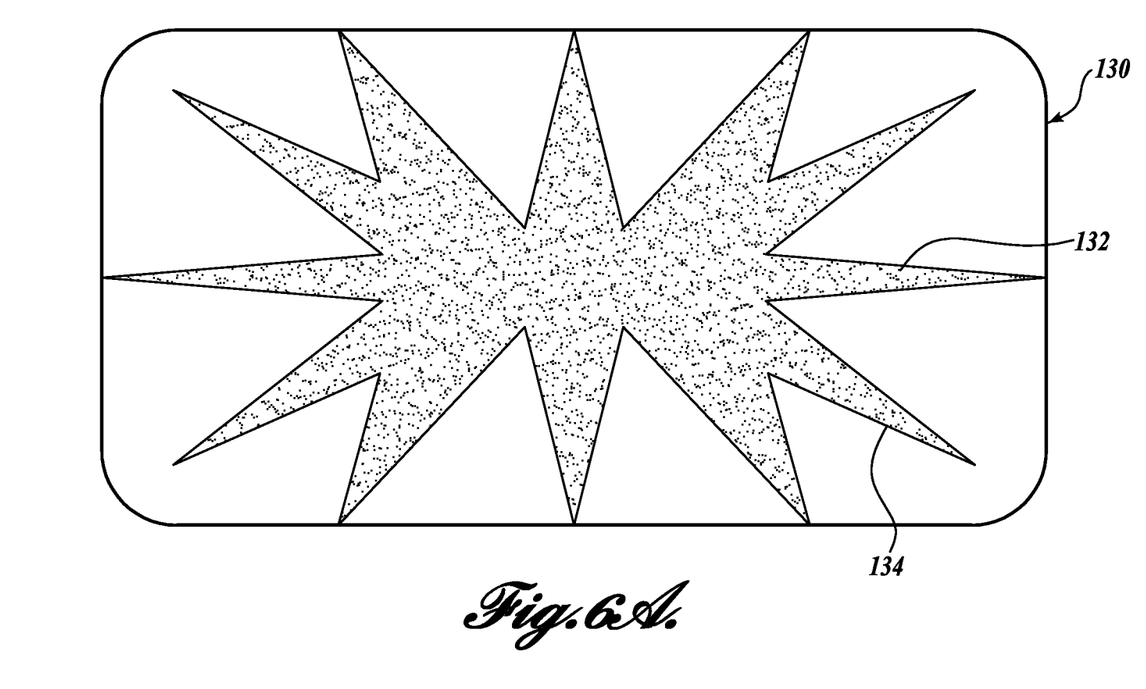
FIGS. 6A-6C illustrate in plan view exemplary adhesive patterns suitable for use on the adhesive panels for the trap shown in FIG. 1.

A plan view of an embodiment of an adhesive panel 130 suitable for use with the present invention is shown in FIG. 6A. In this embodiment the adhesive panel 130 includes a generally star-shaped adhesive portion 132 disposed on the panel 130, wherein other portions of the panel 130 are not adhesive. Although it is also contemplated that the adhesive panel may be substantially or completely covered with an adhesive, the current shape of the adhesive portion 132 is intended to provide a relatively larger perimeter 134 for the size of the adhesive panel 130. In particular, a crawling pest entering the adhesive portion 132 becomes stuck relatively quickly. Therefore the interior of the adhesive portion 132 is relatively inaccessible to crawling arthropods, and therefore ineffective for trapping crawling pests. Pests trapped near the perimeter 134 not only block the adhesive portion 132 to subsequent crawling pests, but they may also deter other pests that are very near the trapped pest from entering the trap 100.

For the present invention it is preferred to provide a shaped adhesive portion 132 that provides a relatively large perimeter 134 length relative to the area of the adhesive panel 130. A generally star-shaped pattern for the adhesive portion 132 provides a relatively large perimeter 134, while also widely separating the adhesive elements near the outer perimeter of the panel 130. Therefore, pests are more able to enter deeply into the trap 100 before becoming stuck to the adhesive portion 132.

Figure 6B:
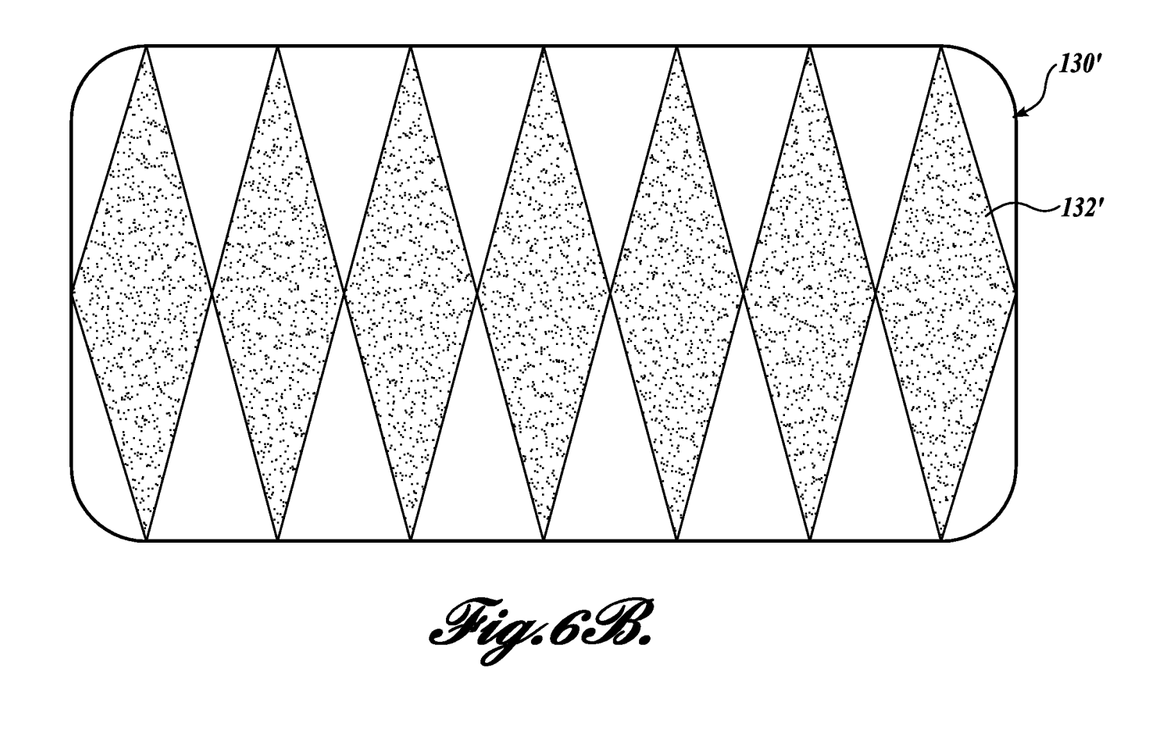
Figure 6C:
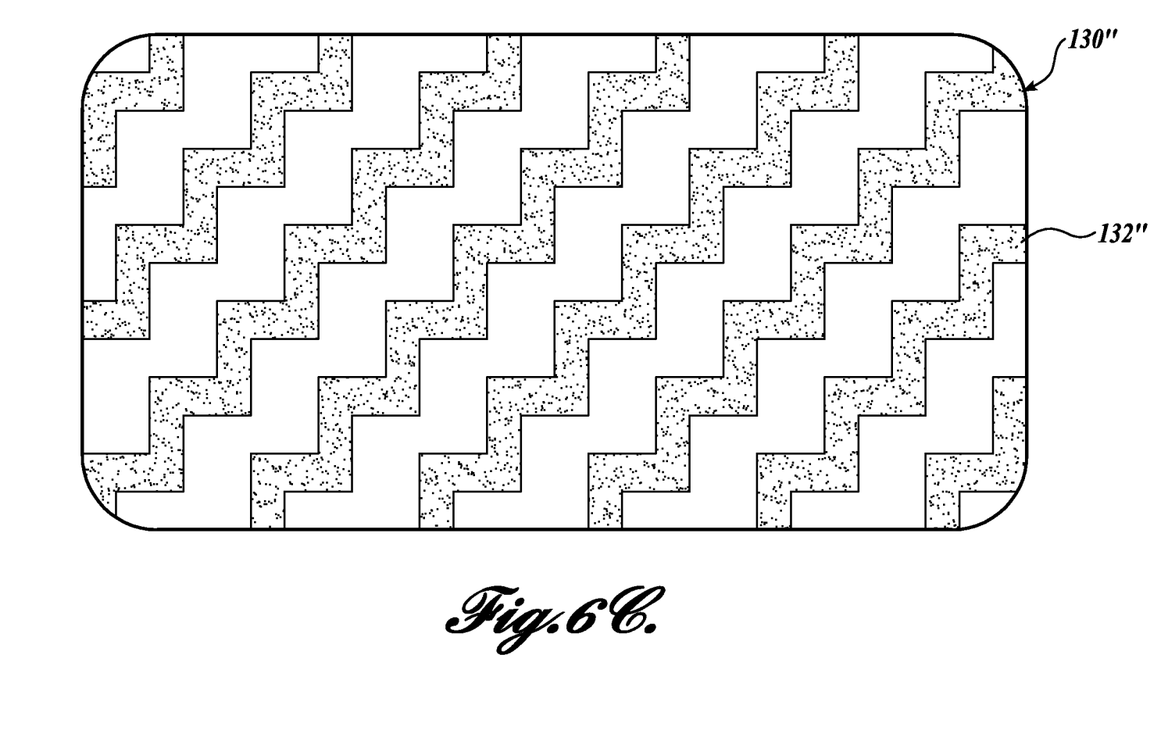

Other exemplary large perimeter patterns for the adhesive portions 132', 132" are illustrated in FIGS. 6B and 6C. On adhesive panel 130', an adhesive pattern 132' comprising an array of transverse triangles are applied to the panel 130'. On adhesive panel 130", a zigzag pattern of adhesive 132" is applied to the panel 130".

It is also contemplated that the adhesive for the adhesive panels 130, or the panels 130 themselves, may be provided with a natural or synthetic attractant to lure a target insect or other pest into the trap.

Figure 7:
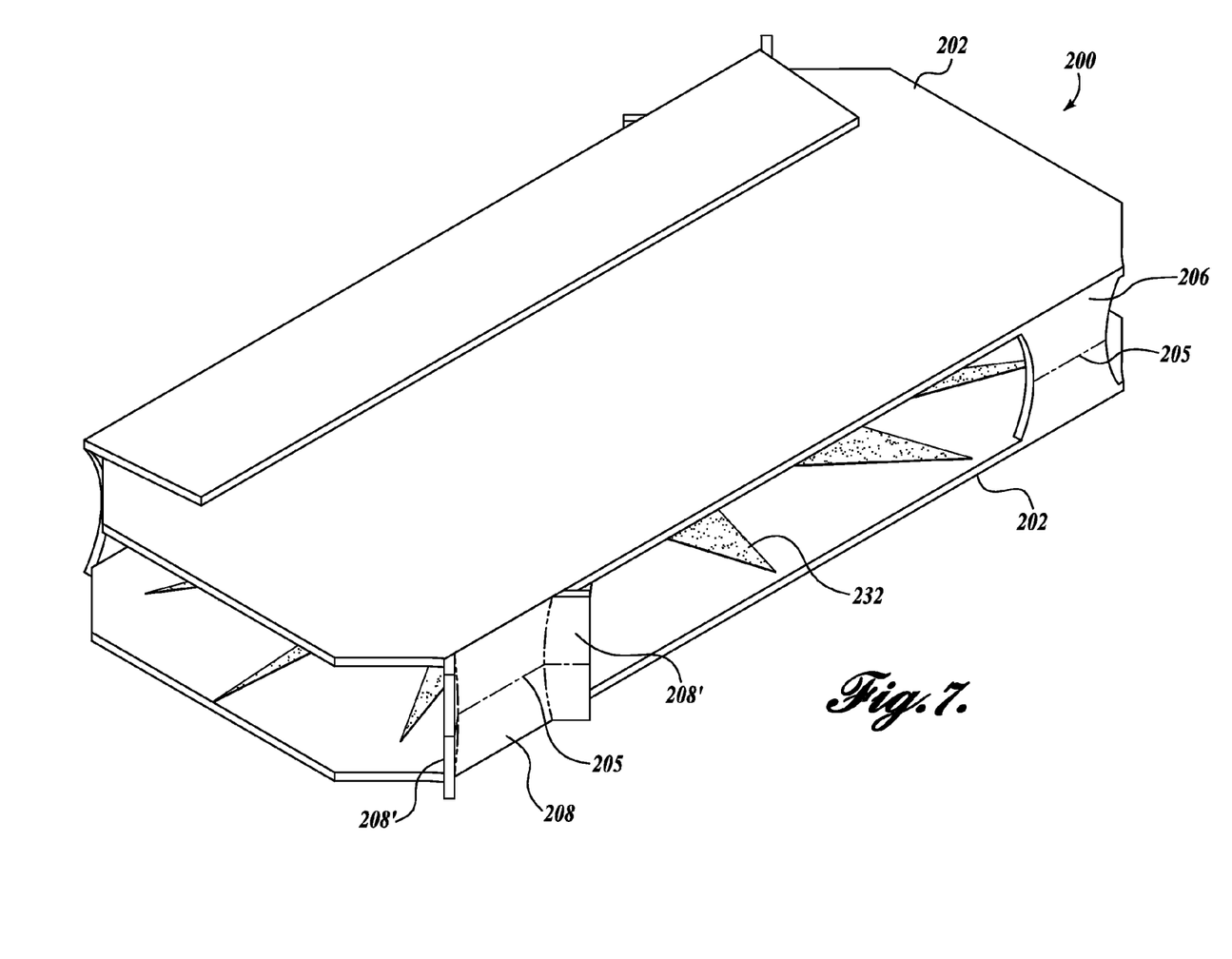
FIG. 7 is a perspective view of a second embodiment of a trap in accordance with the present invention, that is fully disposable.
Figure 8:
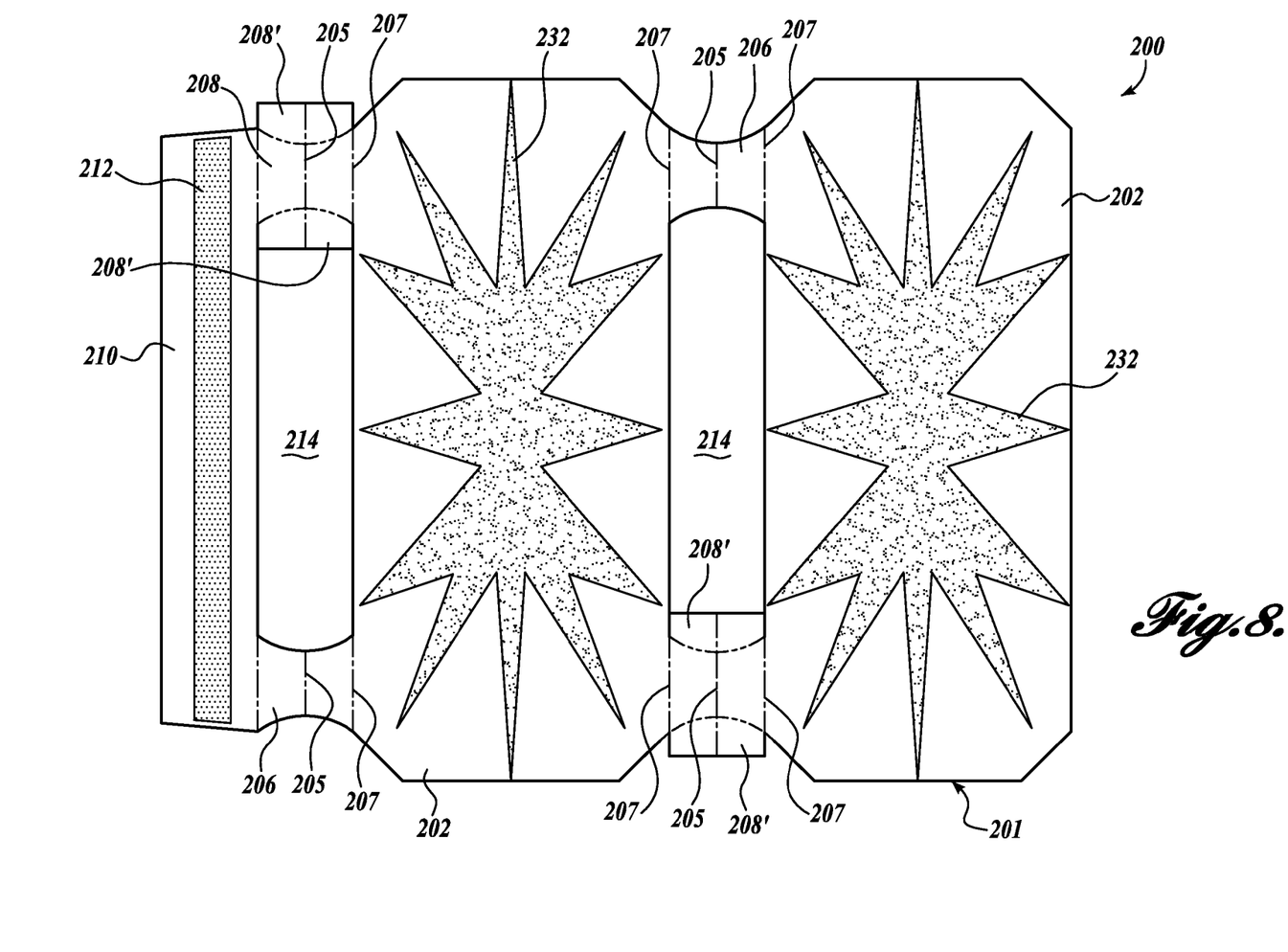
FIG. 8 is a plan pattern view for forming the trap shown in FIG. 7.
Figure 9:
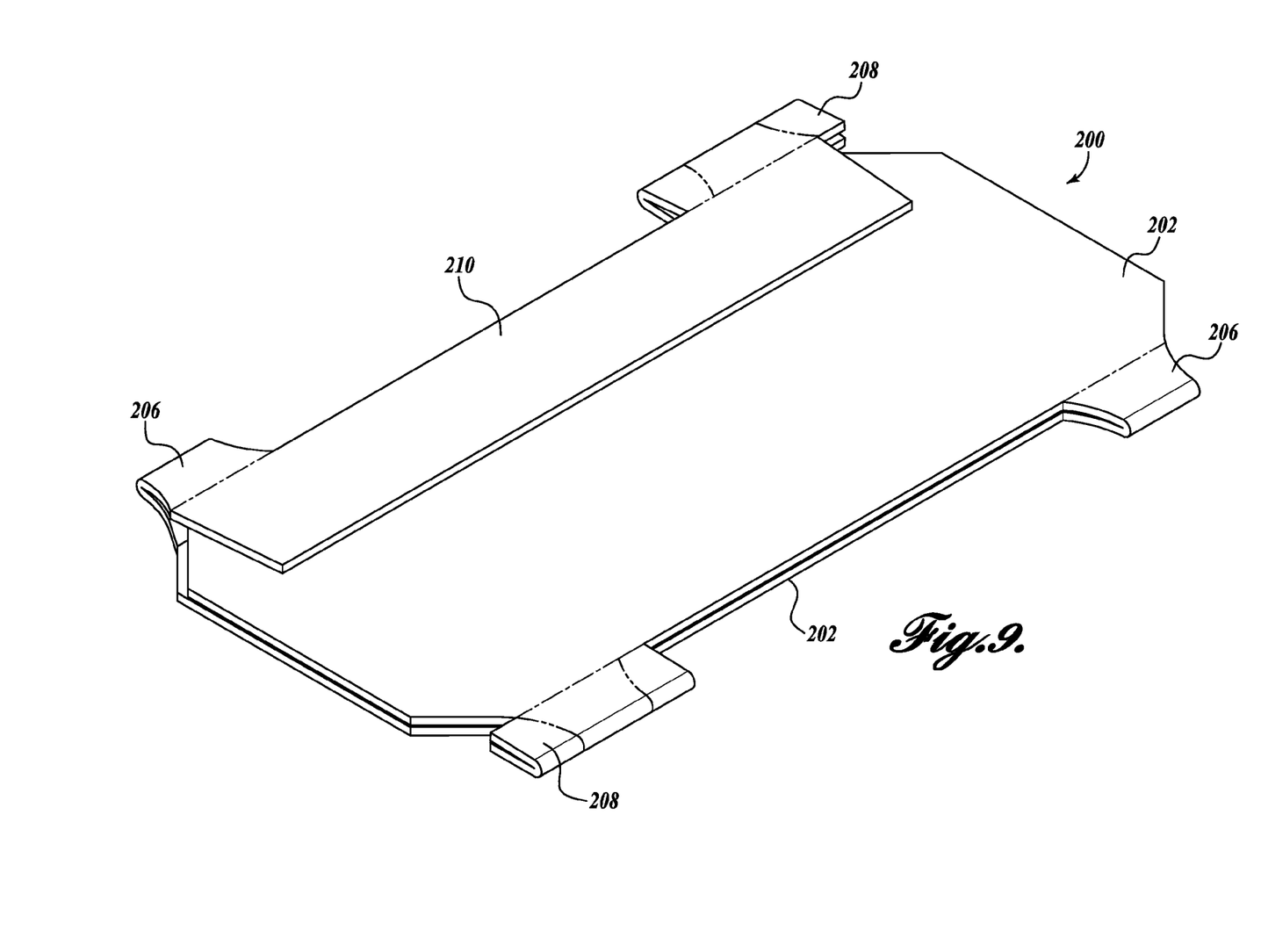
FIG. 9 is a perspective view of the fully disposable trap shown in FIG. 7, shown crushed and ready for disposal.

Although the trap 100 described above was constructed using reusable polymeric wall portions 102 with disposable and replaceable panels 130, a crushable, fully disposable trap 200 for crawling arthropods is shown in FIGS. 7-9. In this alternative construction upper and lower adhesive panel portions are incorporated into a stiff but crushable open fiberboard or cardboard trap. This fully disposable embodiment, the trap 200 may be set out to entrap the target pest, for example, spiders, and then stepped on or otherwise crushed to encapsulate the trapped pests, thereby protecting the user from potential danger from recently-trapped pests.

In FIG. 7 the fully disposable trap 200 defines upper and lower panels 202, each having a large perimeter adhesive pattern 232 defining non-adhesive pathways deep into the trap 200. The adhesive pattern 232 is defined on the inwardly-facing surfaces of the panels 202, the opposed surfaces thereby defined facing beds to define an entrapment region therebetween. The disposable trap 200 is invertible, similar to the trap 100 discussed above. In this exemplary embodiment, the adhesive portions 232 are patterned to correspond approximately to the adhesive portion 132 shown in FIG. 6A. It will be readily apparent that other patterns, for example those shown in FIGS. 6B and 6C, may alternatively be used.

The upper and lower panels 202 are joined and held in approximately parallel orientation by four spaced apart perimeter posts 206, 208 (two visible in FIG. 7). Therefore, the interior of the trap 200 is accessible from all sides. In this embodiment, two diagonally opposed posts 208 (one visible) further define opposed flap portions 208' that extend from the center portion of the post 208, and are configured to bend outwardly (e.g., by the user pinching the tab portions 208'. The tab portions 208' thereby provide outwardly-extending tabs to facilitate placement and moving the trap 200 during use (for example, flipping the trap over), allowing the user to keep their fingers away from the interior of the trap 200. The tab portions 208' also aid in maintaining the trap 200 in the open position shown in FIG. 7.

In a current embodiment, the trap 200 is formed from a flat panel of a stiff paperboard, although it is contemplated that other materials, such as a thin polymeric panel, may alternatively be used. Paperboard (and most thin polymeric panels) will typically have a stiffness such that the posts 206, 208 easily maintain the upper and lower panels 202 in the desired spaced-apart relation. In addition, the posts have an inherent elasticity in bending, such that the posts 206, 208 will flex to elastically bias the upper and lower panels 202 apart.

FIG. 8 shows the trap 200 prior to assembly by the user, in plan-form. The flat panel 201 includes the upper and lower panels 202, and the posts 206, 208. The posts 206, 208 are scored or perforated 207 along the edges joining the upper and lower panels 202, to facilitate folding the trap 200. The side entryways for the trap 200 are defined by the corresponding apertures 214. In addition, scoring or perforations 205 are optionally provided approximately on a midline of the posts 206, 208 (including the tab portions 208'). The perforations 205 facilitate the upper and lower panels 202 coming together in approximate alignment when the trap is crushed.

The upper and lower panels 202 are provided with respective patterned adhesive portions 232. It is contemplated that, for packaging, the adhesive portions 232 may be overlaid with a protective, peel-away strip (not shown) that would be removed by the user when initially setting up the trap 200. An end flap 210 with an adhesive strip 212 extends from one end and is configured to fold over the opposite panel to assemble the trap 200.

Therefore, to set up the trap 200 the user simply chooses a suitable location for the trap, and folds along the perforations 207 on either end of the posts 206, 208 to define the approximately rectangular trap volume. The peel-away strips (if present) are removed to expose the adhesive portions 232, and to expose the adhesive strip 212. The adhesive strip 212 is pressed against the outer surface of the corresponding panel 202. The user may then pinch the tab portions 208' to define the outwardly-extending grips.

FIG. 9 shows the trap 200 crushed after use, which may be accomplished by simply stepping on the trap. The tab portions 206, 208 extend outwardly, and the trapped pests are safely encapsulated between the upper and lower panels 202, facilitating safe disposal of the trap 200.

The embodiments of the invention in which an exclusive property or privilege is claimed are defined as follows:

1. A pest trap comprising:
   a first wall portion comprising a disposable first adhesive panel;
   a second wall portion comprising a disposable second adhesive panel;
   a plurality of biasing elements that engage the first wall portion and the second wall portion and elastically bias the second wall portion away from the first wall portion, such that the first and second wall portions define an entrapment region therebetween;
   wherein the first wall portion is elastically movable towards the second wall portion against the bias produced by the biasing elements to close the entrapment region such that the disposable first adhesive panel contacts the second adhesive panel.

2. The pest trap of claim 1, wherein the first wall portion comprises a plurality of posts and the second wall portion comprises a plurality of tubular receivers that are positioned to slidably receive the plurality of posts.

3. The pest trap of claim 2, wherein the plurality of biasing elements are disposed within the plurality of tubular receivers.

4. The pest trap of claim 2, wherein the first wall portion further comprises an annular recess, each annular recess disposed around a corresponding one of the plurality of posts, and further wherein the plurality of annular recesses are sized and configured to slidably receive a corresponding one of the plurality of tubular receivers on the second wall portion.

5. The pest trap of claim 1, wherein the first wall portion comprises a sloped ramp that provides access to the entrapment region.

6. The pest trap of claim 1, wherein the first wall portion comprises a plurality of sides that each define a sloped ramp providing access to the entrapment region, such that the entrapment region can be entered from all sides of the pest trap.

7. The pest trap of claim 1, wherein the first adhesive panel is separable from the first wall portion, and the first wall portion further comprises an interior aperture through a thickness of the first wall portion and a flexible panel fixed along one edge of the interior aperture, such that the flexible panel may be flexed inwardly to dislodge the disposable first adhesive panel.

8. The pest trap of claim 7, wherein the second adhesive panel is separable from the second wall portion, and the second wall portion further comprises an interior aperture and a flexible panel fixed along one edge of the interior aperture and disposed opposite the first wall portion flexible panel.

9. The pest trap of claim 1, wherein the first wall portion is substantially identical to the second wall portion.

10. The pest trap of claim 1, wherein the disposable first adhesive panel comprises a substrate having an irregularly shaped pattern of adhesive disposed thereon, wherein the irregularly shaped pattern of adhesive defines a plurality of non-adhesive paths into the entrapment region.

11. The pest trap of claim 10, wherein the irregularly shaped pattern of adhesive is star-shaped.

12. The pest trap of claim 10, wherein the irregularly shaped pattern of adhesive comprises a plurality of spaced-apart strips of adhesive.

13. The pest trap of claim 1, wherein the pest trap is configured to allow a user to release the first and second adhesive panels from the first and second wall portions and to dispose of the first and second adhesive panels without directly touching the first and second adhesive panels.

14. A method for trapping crawling pests comprising:
   providing a trap comprising opposed first and second walls that are elastically biased apart to define an entrapment region therebetween, wherein an adhesive portion is retained on each of the first and second walls such that the first and second walls define an upper boundary and a lower boundary of the entrapment region, and further wherein the adhesive portions define a pattern having a large perimeter defining non-adhesive pathways into the entrapment region;
   positioning the trap in a location wherein crawling pests are expected to encounter the entrapment region to become adhered to one of the adhesive portions; and
   after one or more pests have become adhered to one of the adhesive portions, urging the first and second wall portions together until the adhesive portions become adhered together with the one or more pests encased therebetween.

15. The method of claim 14, wherein the first wall comprises a plurality of posts and the second wall comprises a plurality of tubular receivers that are positioned to slidably receive the plurality of posts.

16. The method of claim 15, further comprising a plurality of biasing elements, each biasing element disposed within one of the plurality of tubular receivers.

17. The pest trap of claim 14, wherein the first wall comprises a sloped ramp that provides access to the entrapment region.

18. The pest trap of claim 14, wherein the first and second walls are substantially rectangular, and the pest trap defines an entryway between the walls on all four sides of the substantially rectangular walls.

19. The pest trap of claim 14, wherein the pattern defined by the adhesive portions is star-shaped.

20. The pest trap of claim 14, further comprising the step of disposing of the first and second wall portions without directly touching the first and second wall portions.

\* \* \* \* \*